Nov. 28, 1950

A. A. WOLF 2,531,488

BACKLASH COMPENSATOR

Filed Nov. 30, 1945

INVENTOR
ALFRED A. WOLF
BY *S. D. O'Brien*
ATTORNEY

Nov. 28, 1950     A. A. WOLF     2,531,488
BACKLASH COMPENSATOR

Filed Nov. 30, 1945     3 Sheets-Sheet 2

INVENTOR
ALFRED A. WOLF
BY
ATTORNEY

FIG.5

| | Signal X 0 5 10 15 20 25 30 35 | Fuze settings 0 5 10 15 20 25 30 35 40 | Conditions |
|---|---|---|---|
| H | (bar at 30) | C B (near 5), D (near 15) | PROJECTILE PLACED IN HOIST |
| J | (bar at 30) | C B (near 30), D (near 40) | PROJECTILE AT TOP OF HOIST-TIME SETTING HAS BEEN INCREASED TO 30 SEC. |
| K | (bar at 20) | C (near 20), B D (near 30) | PROJECTILE STILL IN THE FLIGHT TIME SETTING HAS BEEN DECREASED TO 25 SEC-BUT, DECREASE TO 15 SEC. REQ'D ERROR |
| L | Z (near 10) (bar at 15) | C (near 15), B D (near 25) | ERROR CORRECTED BY INCREASIN SIGNAL BY 10 UNITS |
| M | (bar at 20) | C B (near 15), D (near 25) | PROJECTILE STILL IN THE FLIGHT TIME SETTING STILL 15 SEC. BUT INCREASE TO 25 SEC REQ'D ERROR |
| N | (bar at 25) Z (near 30) | C B (near 25), D (near 35) | ERROR CORRECTED BY INCREASING SIGNAL BY 10 UNITS. |
| | INDICATOR-REGULATOR SIGNALS IN SECONDS | FUZE SETTINGS IN SECOND. | |

←decrease--increase→    ←decrease--increase→

FIG.6

| | Signal X 0 5 10 15 20 25 30 35 40 | Fuze settings 0 5 10 15 20 25 30 35 40 | Conditions |
|---|---|---|---|
| J' | (bar at 30) Z (near 35) | C B (near 30), D (near 40) | PROJECTILE AT TOP HOIST-TIME SETTING HAS BEEN INCREASED TO 30 SEC. |
| L' | Z (near 10) (bar at 15) | C (near 15), B D (near 25) | PROJECTILE STILL IN THE FLIGHT-TIME SETTING HAS BEEN DECREASED TO 15 SEC. AS REQUIRED. |
| M' | (bar at 25) Z (near 30) | C B (near 25), D (near 35) | PROJECTILE STILL IN THE FLIGHT-TIME SETTING HAS BEEN INCREASED TO 25 SEC. AS REQUIRED. |
| | INDICATOR-REGULATOR SIGNALS IN SECONDS | FUZE SETTINGS IN SECONDS | |

←decrease--increase→    ←decrease--increase→

INVENTOR
ALFRED A. WOLF

Patented Nov. 28, 1950

2,531,488

UNITED STATES PATENT OFFICE 2,531,488

BACKLASH COMPENSATOR

Alfred A. Wolf, Dallastown, Pa.

Application November 30, 1945, Serial No. 632,093

3 Claims. (Cl. 318—24)

(Granted under the act of March 3, 1883, as amended April 30, 1928; 370 O. G. 757)

The present invention relates to backlash compensating arrangements and, while it has a considerable range of prospective application, it is of particular utility in servo mechanisms of the type comprising means for transmitting an electrical order signal and means responsive to the order signal for producing a mechanical positional response. Such systems suffer from undesired continuous lags between order and response caused by mechanical play in gearing, elasticity in shafting and other phenomena included under the general term of "mechanical backlash," and also caused by "electrical backlash," both types of backlash being herein included under the generic term "elastance parameters." In the following specification and in the claims appended thereto the terms "backlash" and "elastance parameter" are intended to include all such factors which tend to cause an undesired substantially constant error between order and response.

It is an object of the present invention to provide a novel and improved arrangement for reducing the undesirable effects of backlash in electromechanical servo systems.

In accordance with the invention there is provided in an electrically controlled system of the type including means for transmitting an electrical order signal and means responsive to the order signal for producing a mechanical output response, and in which backlash tends to produce an effect corresponding to that which would be produced in an ideal system by a modification of the electrical order signal, a novel compensating arrangement. This arrangement comprises detecting means coupled to the signal-transmitting means for detecting the introduction of backlash into the system and means coupled to the responding means and actuated by the detecting means for counter-modifying the order signal, thereby to overcome the undesirable effects of backlash.

Since my research in servo mechanisms and investigation of the elimination of backlash in fuze-setting projectile hoists posed the problems presented by backlash and solved by the present invention, the invention is herein disclosed in connection with a fuze-setting arrangement of the type controlled by an electromechanical servo system. The fuze-setter is associated with a projectile hoist. The invention is so disclosed for purposes of illustration and not of limitation and it will be understood by those versed in the electrical and mechanical arts that the utility of the invention is not confined to this particular fire-control application.

The novel features believed to be characteristic of the invention are set forth with particularity in the appended claims. The invention itself, both as to its organization and method of operation, together with further objects and advantages thereof, will best be understood by reference to the following specification, taken in conjunction with the accompanying drawing in which:

Figure 3:
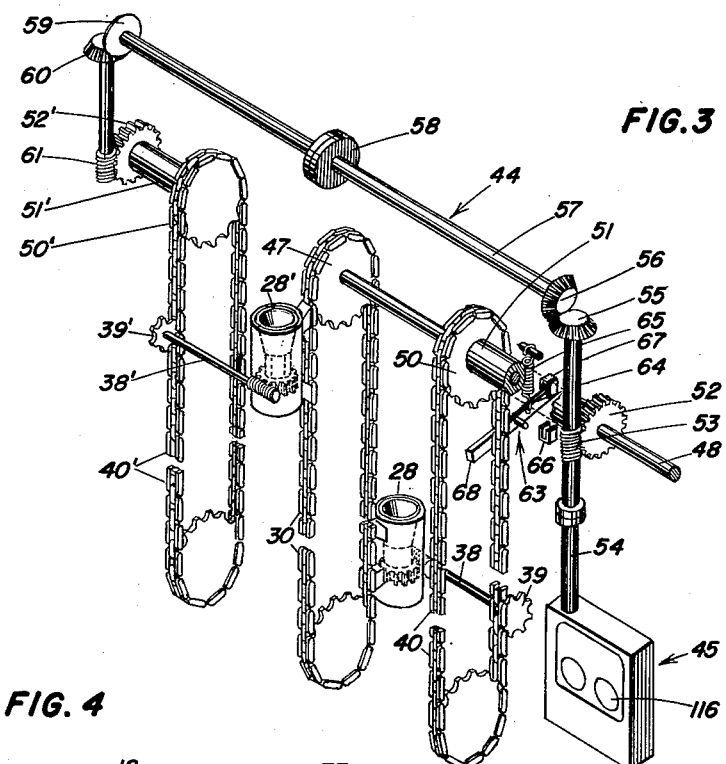
Fig. 3 is a schematic diagram of a conventional projectile hoist and fuze-setting arrangement.
Figure 4:
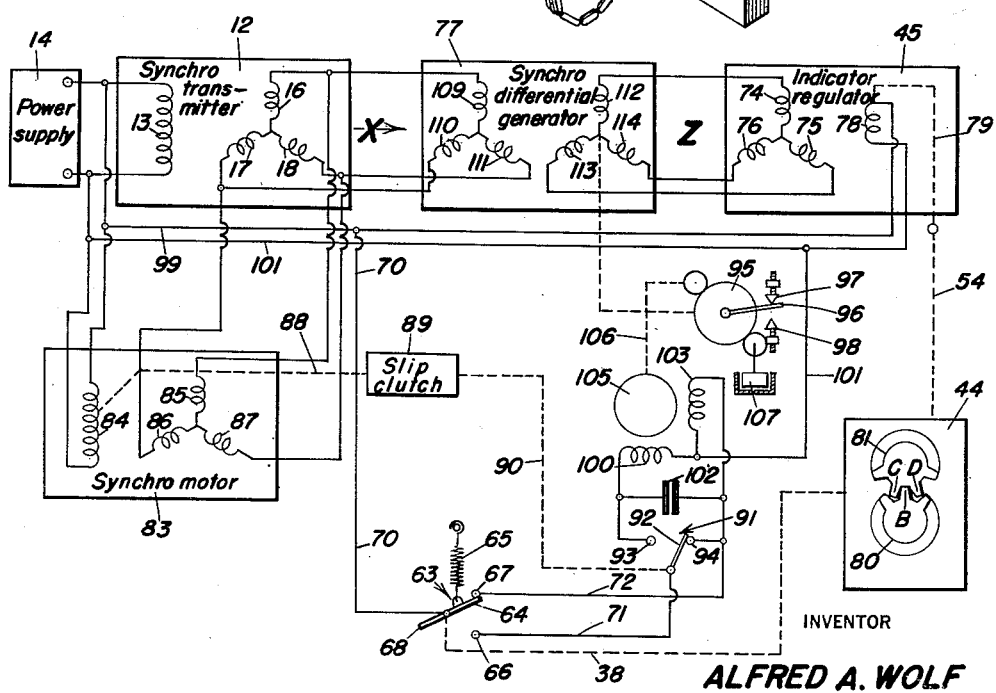
Fig. 4 is a circuit diagram of a complete electromechanical control system embodying a preferred form of backlash compensator in accordance with the present invention, for controlling the fuze-setting arrangement illustrated in Fig. 3.

Fig. 5 comprises a set of graphs for indicating the nature of undesired errors which occur in a fuze-setting arrangement lacking backlash compensation; and Fig. 6 comprises a set of graphs for explaining the operation of the system illustrated in Fig. 4, in which backlash compensation is provided in accordance with the invention for controlling the fuze-setting arrangement illustrated in Fig. 3, thereby eliminating the undesired errors represented by Graphs K and M of Fig. 5.

Fire-control systems generally comprise director and range finding equipment for finding the elevation, bearing and range of a selected target and for transmitting to a computer electrical signals indicative of these fire-control data. These data being known, the time of flight of a projectile from a gun to the selected target becomes known, and the computer accordingly transmits an electrical order signal indicative of a proper projectile fuze time-setting. When set in accordance with the order the fuze causes detonation of the projectile, in which it is installed, upon attainment of proximity to the target. The signal is generated by a self-synchronous generator included in the computing equipment and hereinafter referred to as a "synchro transmitter." The transmitter is schematically represented by unit 12 in Fig. 4. It comprises a rotor including a winding 13 coupled to a conventional alternating-current power supply 14. When the rotor is turned by the computing mechanism it induces in stator windings 16, 17 and 18 electrical currents, the magnitudes of which are such as to indicate the amount by which an existing fuze time-setting is to be changed, and the phase relationships of which are indicative of the direction of change, that is, whether the change is in the direction of an increasing or a decreasing time. The order signal, represented by the letter "X," is significant both as to direction and magnitude and is therefore a vector quantity. Signal "X" is that which orders or initiates a fuze-setting change. This system of order-signal generation is a prior-art expedient.

Figure 1:
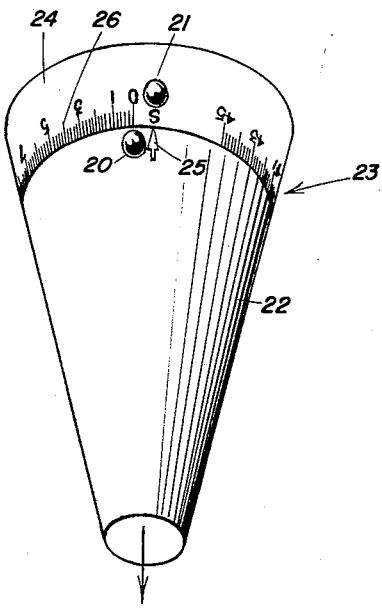
Fig. 1 is a perspective view of a conventional projectile fuze, in the time-setting of which the invention has particular utility, that being a function of the angular relation between the fixed and time-setting lugs illustrated.

Referring now specifically to Fig. 1 of the drawings, the change in fuze-setting is effected by angularly displacing a time-setting lug 20 with respect to a fixed lug 21 of a projectile fuze 23. A ring portion 24, with which, lug 21 is integral, is rigidly secured to a projectile (not shown) and a nose portion 22, with which lug 20 is integral, is rotatable with respect to the ring portion. The position of a scribe mark 25 with reference to a calibrated scale 26 represents the fuze-setting time in seconds. If the fuze be viewed in the direction indicated by the arrow, counter-clockwise rotation of lug 20 with respect to lug 21 decreases the fuze time-setting and clockwise rotation of lug 20 increases the fuze-setting. The fuze illustrated in Fig. 1 is a prior-art device and comprises any suitable mechanism (not shown) for detonating the projectile after a predetermined time governed by the lug setting.

During battle operations the time-setting of a fuzed projectile is generally made as the projectile is hoisted from a magazine to a gun mount. For this purpose, the projectile is first placed nose downward in a projectile flight 28. The flight is a prior-art device comprising an outer socket 29 rigidly secured to a hoist chain 30. Socket 29 is slidably fitted for translatory motion in a suitable guide 31. Upward movement of chain 30 elevates the flight and projectile. An inner socket 32 is fitted for rotation within the outer socket on a bearing-and-race arrangement 33. Rigidly secured to the inner socket is a shaft 34. A worm wheel 35 is fitted to the shaft. The shaft is journaled in an opening in a base member 36, the latter being rigidly secured to the outer socket. Rotation of the inner socket with respect to the outer socket is effected by a worm gear 37 meshing with the worm wheel and cut on a shaft 38, the latter being securely fitted to a sprocket 39. The sprocket meshes with a fuze-setter chain 40. Cut in the outer socket is a V-slot 41 and secured to the inner socket are spring-loaded pawls 42. The projectile fuze is manually set in the "safe" position, illustrated in Fig. 1, and so placed in the projectile flight that fixed lug 21 immediately engages with V-slot 41. When spring loaded pawls 42 are in alignment with time lug 20 they engage it and rotate it to a desired position. For purposes of confining the explanation to those features of the projectile flight which immediately relate to the invention it will be assumed that the flight has the following mode of operation: (1) When the fuze-setter chain is stationary, hoisting of the flight causes the sprocket, worm gearing, inner socket and time lug to rotate in the directions indicated, thus increasing the fuze time-setting, the inner socket rotation being clockwise; (2) when the hoist chain and flight are stationary and the fuze-setter chain is moved vertically downwardly, the time-setting is increased; (3) when the hoist chain is stationary and the fuze-setter chain is moved vertically upward, the fuze time-setting is decreased.

Reference is now made specifically to Fig. 3 for a description of the hoist and fuze-setting arrangement, otherwise conventional, with which the present invention is employed in a preferred embodiment. There are illustrated a conventional hoist and fuze-setting arrangement 44 and an indicator-regulator 45. The mechanisms comprise a projectile flight 28, an endless hoist chain 30, a fuze-setter chain 40 (these being illustrated in detail in Fig. 2) and appropriate means for positioning the hoist and fuze-setting chains. Transmitter 12 (illustrated in Fig. 4) comprises means for transmitting an electrical order signal and the fuze-setting hoist and indicator-regulator illustrated in Fig. 3 (and included in the complete electromechanical system schematically shown in Fig. 4) comprise means responsive to the order signal for producing a mechanical positional response, that response being the setting angle between lugs 20 and 21 of the fuze.

The hoist chain meshes with a sprocket 47 fitted on a shaft 48, this shaft being mechanically coupled to a suitable hydraulic motor (not shown). Motion is imparted to the fuze-setter chain by a sprocket 50, rigidly fitted to an outer drive 51, the latter being rotatable on and coaxial with shaft 48. Also fitted to the outer drive is a worm wheel 52, meshing with a worm gear 53, the latter being mechanically coupled by a shaft 54 to the output of servo mechanism (not shown) included in an indicator-regulator 45. The immediate function of the indicator-regulator is angularly to position shaft 54 and its ultimate function is to position the fuze-setter chain in such fashion as to increase or decrease the fuze-setting, as ordered. When the motions of the fuze-setter chain and other mechanical members are in the direction indicated, the fuze time-setting of flight 28 is increasing.

Figure 2:
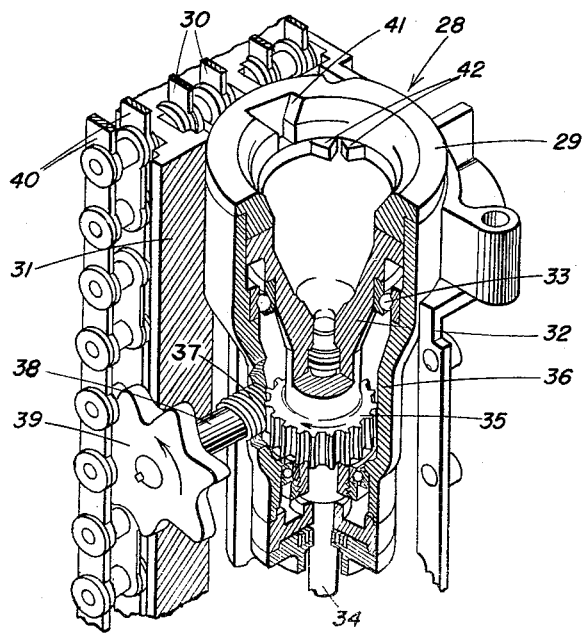
Fig. 2 is a perspective view, partly in section, of a conventional projectile flight for determining the relative positions of the fixed and time-setting fuze lugs during and following hoisting of a projectile from a magazine to a gun-mount platform.

Those members of the hoist and fuze-setter 44 which are illustrated in Fig. 3 bear the same reference numerals as corresponding Fig. 2 members, and duplicate members bear the same reference numerals primed. Two projectile flights are attached to the hoist chain. The hoist chain moves in an oscillatory manner so that when flight 28 rises, flight 28' falls and when flight 28' is elevated flight 28 is depressed. The operation of flight 28' is not further considered herein other than to indicate that it is coupled to the output shaft of the indicator-regulator by an appropriate system of gearing, shafts and coupling 55, 56, 57, 58, 59, 60, 61, 52', 51', 50', 40' and 39'. It will be understood that the operation of flight 28' and setter chain 40' is essentially the same as that of flight 28 and chain 40, so that attention is now directed to the latter.

A switch 63 is so arranged that when the projectile flight reaches the top of its travel, shaft 38 strikes an insulating handle 68 attached to a blade 64 and forces the blade into contact with a contact 66. This switch is represented schematically in Fig. 4 and its purpose is indicated in the description of the system there represented. Any suitable arrangement for closing the circuit between conductor 70 and conductor 71 when the flight is at the top of the hoist and for closing the circuit between conductor 70 and conductor 72 when the projectile is being lifted up the hoist may be substituted for the particular switch illustrated in Fig. 3.

The overall operation of the fuze setter and hoist 44 is such that sprocket 39 transmits fuze-setting adjustments from chain 40 to the time fuze 23 in the following manner: (1) By movement of the flight with respect to the fuze chain when the projectile is hoisted, the gearing being so arranged that movement of the flight from the lower to the upper positions causes the inner socket to rotate in such a direction as to increase the time setting; (2) by movement of the fuze chain 40. controlled by the regulator 45. Before the hoisting operation is performed fuze 23 is set on the "safe" position by manually adjusting time lug 20. The projectile is then placed in the flight with the fixed fuze lug 21 in V-slot 41. In the absence of any motion of the fuze setting chain, the hoisting operation is such that the time ring is rotated from the "safe" setting up to a longer time setting. The pawls on the inner socket engage the time lug when these parts are in alignment and further rotation of the socket, after engagement, sets the fuze. During hoisting, the point in the flight travel at which engagement takes place depends upon the motion of the fuze setting chain.

In order to clarify the explanation of the operation of the invention, it will further be assumed that the following conditions prevail: (1) The electrical output order signal of synchro transmitter 12 is of zero units for a desired fuze setting of 30 seconds; (2) when all backlash is taken up when the electrical order signal has a value of zero units (a 30-second fuze setting order), when flight 28 is at the bottom of the hoist, and when the fuze is set on "safe" a projectile is so placed in flight 28 that the engaging means 41 and 42 immediately engage lugs 21 and 20 respectively; (3) the rotation of socket 32 during the elevation of the flight to the top of the hoist is such as to increase the time setting of the fuze to 30 seconds, when the fuze-setting chain is stationary on a zero position; (4) that when the rotor of synchro transmitter 12 is rotated through any unit, say 5 degrees, in a clockwise direction, the resultant movement of chain 40 is such as to increase the fuze setting by a corresponding member of units, say 5 seconds; (5) that when the rotor of transmitter 12 is moved counter-clockwise by 5 degrees, the movement of the fuze-setter chain is such as to decrease the time setting by 5 seconds, and so on.

Referring now to Fig. 4, the elements thereof like in structure and function to corresponding elements shown in Fig. 3 have the same reference numerals. In a prior art system the stator windings 16, 17, and 18 of transmitter 12 are directly connected to the respective ones of stator windings 74, 75 and 76 of a synchro motor or self-synchronous receiver included in indicator-regulator 45. Neglecting for the moment my departure from the prior art and the operation of synchro differential generator 77, it may first be assumed that the transmitter and receiver stator windings are so coupled. The synchro receiver includes a rotor having a winding 78 electrically coupled to the power supply. The operation of the synchro transmitter and receiver is such that when the transmitter rotor is rotated the motor rotor follows and assumes a corresponding position. The angular position of the receiver rotor is therefore dictated by the electrical order signal "X."

The indicator-regulator includes appropriate conventional amplifying and follow-up expedients (not shown) for utilizing the electrical order signal "X" and the corresponding motion of the rotor of the receiver to cause rotation of shaft 54 (Fig. 3) in accordance with signal "X." Those amplifying and follow-up arrangements are included in a suitable servo mechanism indicated by the dashed line 79. This dashed line merges with the dashed line 54, representing shaft 54, in order symbolically to indicate that the angular position of shaft 54 is a function of the angular position of the indicator-regular synchro-receiver rotor. As pointed out in the description of Fig. 3, the angular position of shaft 54 governs the operation of fuze setter 44.

It is assumed that backlash has been taken up in the intial operation of the system. This process involves taking up of the "twist" of shaft 54, meshing of gears 53 and 52, taking up of the "twist" of outer drive 51, meshing of gear 50 and chain 40, stretching chain 40 taut, meshing of chain 40 and sprocket 39, and preliminary cancellation by manual adjustment of all backlash factors, whether mechanical or electrical, starting with synchro transmitter 12 and continuing on through the indicator-regulator and the fuze setter down to lugs 20 and 21.

In other words, all of the play-limiting factors have been taken up in one direction, so that an electrical order signal causes an instant mechanical output response. This condition is graphically illustrated by the relationships between gear teeth C, D and B illustrated in Fig. 4. The play between tooth B of gear 80 and tooth D of gear 81 graphically represents all of the backlash which has been taken up in the various elements of the fuze-setting system under the conditions assumed. It will be understood that gears 80 and 81 are not intended to represent any specific elements but symbolically represent all of the elastance parameters of the overall fuze setting system. Gear tooth B represents lug 20 and teeth C and D represent the limits of play between which play must be taken up before B can be rotated as the result of an order signal.

Reference is now made specifically to Fig. 5 for a consideration of the operation of the prior art system and of the arrangements provided in accordance with the present invention for eliminating the undesirable effects of backlash. The abscissae against which the electrical order signal "X" is plotted are fuze-setting time in seconds. "X" represents the order and B represents the positional response of the time-setting lug on the fuze, the abscissae again being in seconds. Elements C and D represent the play limits between which the elastance parameters of the fuze-setting system exist. Graph H therefore represents the conditions existing at the time when a projectile is placed in the hoist. Backlash has been taken up so that play-limit C is against element B. This simply means that system is taut and that the fuze time setting can immediately be increased without difficulty from backlash at this stage. Graph J represents the conditions which prevail when the projectile has been lifted to the top of the hoist. The time setting has been increased to 30 seconds by reason of the rotation of sprocket 39 against stationary chain 40 and the resultant clockwise rotation of the inner socket as the hoist chain 30 pulls the projectile flight upwardly. The electrical signal "X" is ordering a time setting of 30 seconds and therefore the electrical signal is of zero units, the synchro transmitter rotor being on its zero position. The fuze setting has been changed from "safe" (which is substantially at zero) to 30 seconds and no difficulty has yet been experienced with backlash. It will be apparent that under these conditions the fuze setting can be increased without introducing errors due to backlash. However, as indicated by Graph K, as soon as elastance parameters are introduced into the system by a reversal of the order signal, backlash causes serious errors in fuze setting. If instead of increasing, the order signal decreases to 15 seconds, as indicated in Graph K, then play limit D would have to be displaced by 10 units before it would even begin to transmit motion to the driven element B and it would thereafter drive element B in decreasing direction through only 5 units.

The significance of this is that the prior art system, under the conditions assumed, performs satisfactorily in response to a signal which is always in one direction (that is a signal which always calls for an increment to the change in fuze setting caused by the hoisting operation) provided that initial backlash is taken up. However, upon reversal of the direction of the order signal elastance parameters are introduced in the system and serious errors in fuze time-setting result. This undesired effect may be understood by a study of Fig. 4, where it can be seen that if a "decrease" signal requires gear tooth B to be driven in a counter-clockwise direction, play-limiting gear tooth D moves through a considerable distance before it engages gear tooth B. Graph K shows that while the order electrical signal calls for a time setting of 15 seconds, the actual time setting of driven element B is 25 seconds. The error of 10 seconds is, of course, greatly exaggerated for the purpose of clarifying this description, but my research with prior-art fuze setters indicates that the average error is of the order of 0.15 second, and the maximum error is of the order of 0.18 second, the errors being so great as adversely to affect fire control.

In the interest of attaining the accuracy demanded by modern anti-aircraft fire control it is desirable that such errors be reduced to a minimum. Graph L discloses the principle which I employ in reducing the effect of undesired backlash. In an ideal system, not subject to the limitations of backlash, the undesired effects indicated by Graph K could have been produced by modifying electrical signal "X." For example, even in a perfect system, if the signal "X" could be so modified that a resultant signal applied to the indicator-regulator servo mechanism calls for a fuze setting of 25 seconds rather than 15 seconds, as desired, then the driven element B would assume the position indicated in Graph K. If in a perfect system this undesired result could be produced by a modification of the electrical order signal, it follows that in an imperfect system, as all electromechanical control systems are, the undesirable result of backlash can be compensated for by modifying the electrical order signal in a manner equal and opposite to that which would produce the undesired result in a perfect system.

Thus, Graph L, indicates that if the signal "X," which calls for a fuze setting of 15 seconds, were so modified that a resultant signal "Z" applied to the servo mechanism calls for a signal of 5 seconds, than the play limit D would move through an additional 10 units and would drive the time lug B to the proper 15-second position called for by order signal "X."

In order to eliminate the undesired effects of backlash in an electro-mechanical system, the following arrangements are required: (1) A means for detecting the introduction of elastance parameters into the system upon reversal of the order signal and (2) a means actuated by the detecting means for so modifying the electrical order signal as to compensate for the undesired effects of backlash. The fuze setting arrangement is essentially a relatively slow-moving control system since the transmitter rotor turning is generally slow. It is desirable, however, that the order signal rapidly be modified or supplemented immediately upon reversal of the order signal. The significance of this is that immediately upon the initiation of a decreasing signal play limit D should rapidly be placed against driven element B, even though further movement of element B in the decreasing time direction may be relatively slow.

Referring now to Graph M it will be seen that the means so provided must be bi-directional in operation. Let it be assumed that the order signal again reverses so that it now calls for setting of 25 seconds. Before play limit C strikes element B it moves through 10 units and it then stops, so that element B remains on a 15 second setting, again introducing an error of 10 seconds into the system. Graph N indicates that this error may be cured by so modifying signal "X" or by so supplementing its action that play limit C rapidly moves through 10 units into contact with element B and then moves through an additional 10 seconds in compliance with order signal "X." Fig. 5 therefore indicates the undesirable conditions which arise in the operation of the prior art system and the requirements of the remedial arrangements.

Referring now to Fig. 4 of the drawing, there is illustrated the means provided in accordance with my invention for detecting the introduction of elastance parameters into the system. This means comprises a self-synchronous motor, hereinafter referred to as a "synchro motor," 83, having a rotor including a winding 84 and having stator windings 85, 86 and 87. Winding 84 is coupled to the power supply, in parallel with winding 13, and the stator phases 85, 86 and 87 are connected to the synchro transmitter stator phases 16, 17 and 18, respectively, so that the synchro motor rotor reverses with and follows the synchro transmitter rotor. The ultimate function of motor 83 and slip clutch 89 is to cause rotor 95 of synchro differential generator 77 to rotate in one direction or the other in such a way that arm 96, rigidly secured to rotor 95, strikes one or the other of adjustable limit stops 97, 98. The rotor of motor 83 is coupled by any conventional system of shafts and gearing indicated by the dashed line 88 to slip clutch 89, the input of the latter being freely rotatable. The output of the slip clutch is limited in rotation in one direction or the other by reason of the touching of blade 92 of a switch 91 on one or the other of contacts 93 or 94. The switch is actuated by any suitable conventional system of gearing and shafting indicated by the dashed line 90, which couples the output of clutch 89 to blade 92.

When blade 64 of switch 63 is closed on contact 66 the operation of switch 91 and associated circuits is as follows: When switch 91 is closed on contact 93 a circuit is completed from the power supply 14, conductor 99, blade 64, contact 66, blade 92, contact 93, field winding 100 and conductor 101 back to the power supply. Another field-excitation circuit is completed through contact 93, phase-splitting capacitor 102, field winding 103, and conductor 101. Thus, when blade 92 is closed on contact 93 the voltage in field winding 103 is phase-advanced with respect to the voltage in field winding 100 and motor 105 rotates in one direction. The motion of the rotor of motor 105 is imparted to the rotor assembly 95 of a synchro differential generator through any suitable system of mechanical coupling indicated by the dashed line 106 and rotor 95 turns until arm 96 strikes the appropriate one of the two limit stops.

When blade 92 of switch 91 is in contact with contact 94, however, the voltage in winding 100 is phase-advanced with respect to that in winding 103, and motor 105 rotates in the opposite direction, the ultimate result being that arm 96 on rotor 95 of the differential generator strikes the other one of the limit stops 97, 98. When blade 92 is in contact with contact 94, one exciting circuit is completed from blade 92 through contact 94 and winding 103 to conductor 101, and the other field-excitation circuit is completed through contact 94, phase-splitting capacitor 102, and winding 100 to conductor 101. Motor 105 may be a two-phase reversible torque motor of any suitable conventional type. In order to stabilize the operation of rotor 95, there is geared thereto a magnetic damping arrangement of any suitable conventional character, indicated generally at 107.

The synchro motor, slip clutch, torque motor, rotor 95, arm 96, limit stops, and switching arrangement 91 may collectively be regarded as a means for detecting the introduction of elastance parameters into the system, for the reason that reversal of the electrical order signal and the accompanying reversal of the synchro transmitter rotor causes arm 96 quickly to strike one of the limit stops 97 and 98 and rotor 95 to be rotated in one direction or the other.

In accordance with my invention I also provide means actuated by the detecting means for so modifying the order signal as to compensate for the undesired effects of backlash. This means comprises a synchro differential generator 77. As is well understood by those skilled in the art, a synchro or self-synchronous differential generator comprises a signal translating device the output signal of which is a function of an electrical input signal applied to its stator windings and a mechanical input signal applied to its rotor. Stator windings 109, 110 and 111 are connected to the respective corresponding phases 16, 17 and 18 of the transmitter stator and rotor windings 112, 113 and 114 are electrically connected to their respective ones of the corresponding phases 74, 75 and 76 of the synchro regulator. The function of the synchro differential generator 77 is to modify the electrical order signal in such a manner as to cause backlash to be corrected immediately upon introduction of elastance parameters into the system by reversal of the order signal.

The circuits illustrated in Fig. 4 are so arranged that when switch 91 is closed on contact 94 the electrical order signal is so modified as to increase the resultant signal applied to the servo mechanism of the indicator-regulator. Conversely, when the switch is closed on contact 93 the resultant signal applied to the servo mechanism is so corrected as to decrease the fuze setting time by an amount greater than that which would result from the uncorrected order signal alone. In the description of Fig. 3 it was pointed out that when the projectile reaches the top of the hoist, shaft 38 forces blade 64 into contact with contact 66. Synchro differential generator 77 is therefore free to apply either "increase" or "decrease" signal correction to the synchro mechanism when the projectile is at the top of the hoist. However, during the upward travel of the flight blade 64 is biased by a compressed spring 65 into contact with contact 67, so that the rotor of synchro differential generator 77 is in the "increase" signal position during the time that the fuze is being elevated up the hoist, thus acting as an auxiliary to the natural action of the fuze setter in increasing fuze setting and taking up backlash.

Reference is now made to Fig. 6 in explaining the operation of my improved fuze setting arrangement including the backlash compensator provided in accordance with my invention. The system may initially be adjusted in substantially the same manner as a system which has the conditions of operation indicated by the graphs in Fig. 5. It is assumed that the fuze setting desired at the top of the hoist is 30 seconds. Under that assumed condition, the rotor of transmitter 12 is on its electrical zero position and the electrical output order signal "X" is equal to zero. The dial 116 (Fig. 3) reads 30 seconds, spring 65 closes switch 63 on contact 67, blade 92 of switch 91 is in contact with contact 94, lever arm 96 is against stop 97, the rotor of the synchro receiver 45 is out of correspondence with the transmitter rotor by an amount equal to the angular displacement of the rotor of unit 77, and all of the backlash of the fuze setter is taken up. Play limit C is initially in contact with driven element B (that is, the system is initially so set up that it immediately responds to an electrical order signal).

When the projectile reaches the top of the hoist, the time setting has been increased to 30 seconds as indicated by Graph J', the system being so adjusted that this setting is the result of the cooperative action of the hoist chain 30 and the fuze setter chain 40. No backlash has been introduced into the system at this time and if the order signal "X" calls for a fuze setting of 30 seconds the driven element B is positioned at 30 seconds and no substantial error occurs. The receiver rotor and all of the fuze setting elements respond faithfully to an increasing signal.

Let it now be assumed that it is desired that the setting be decreased to 15 seconds (Graph L'). The output signal "X" from transmitter 12 is now of a magnitude and direction appropriate to cause such a response, in an ideal system, that the driven element B would be positioned on the 15 second position. However, because of the undesirable effects of backlash in a practical system it is necessary to modify order signal "X" in such a manner that the resultant signal applied to the indicator-regulator servo mechanism has the characteristics indicated by "Z." This modification is accomplished in the following manner: As soon as the order signal from transmitter 12 reverses, the rotor of synchro motor 83 reverses, Movement of the last-mentioned rotor is translated through the coupling expedient 88 and slip clutch 89 to switch 91, closing blade 92 on contact 93. Motor 105 then rotates in such a direction as to bring arm 96 into contact with limit stop 98 and to reverse the angular displacement of the rotor of differential generator 77. Since the resultant output signal of unit 77 is a function of the electrical input plus the mechanical input this resultant signal causes the rotor of the synchro-receiver to turn by an amount greater than the angular displacement which would have been caused by the order signal alone, thus instantaneously taking up backlash (i. e. bringing play limit D into contact with the driven element B). The result is that the driven element B is placed in the 15 second position, as required by the order signal, and no substantial time setting error occurs.

Let it now be assumed that the fuze setting order is changed, so that it calls for a time setting of 25 seconds (Graph M'). The order signal is again reversed and the rotation of the rotor of motor 83 is in a direction opposite to that last discussed, with the ultimate result that the rotor of the differential generator moves in a direction opposite to that last considered. The increasing signal "X" is so modified that the resultant signal "Z" applied to the servo mechanism apparently calls for a setting of 35 seconds. The additional 10 seconds of signal magnitude causes the play between the play limit C and the driven element B immediately to be taken up, and the driven element B is placed in the proper 25-second position.

Limit stops 97 and 98 are adjustable, thereby permitting any desired amount of correction.

In conventional systems a substantial time interval elapses before backlash is even taken up sufficiently to permit driving of the driven element, and thereafter the error introduced by play is not corrected. For example, referring to Graphs J and K of Fig. 5, the movement of play limit D in taking up backlash and coming into contact with the driven element B is at no more rapid a rate than the subsequent movement of the driven element B. However, in my improved system, contacts 93 and 94 are placed in such proximity to blade 92 of switch 91 that the corrective action rapidly occurs upon reversal of the order and the taking up of backlash therefore takes place at a rate which is great with respect to the rate of normal control action of the system. In my improved system, the conditions of operation of which are represented by Graphs J', L', and M' of Fig. 6, neither of the undesired conditions reflected by curves K and M of Fig. 5 prevails. With backlash compensation, I have been successful in reducing the average error to 0.011 second and the maximum error to 0.04 second, under conditions of the same type in which I measured the errors of prior-art fuze-setting systems. It will be understood that the fuze-setting chain may be moved under the control of the indicator-regulator and order signal during the hoisting as well as upon completion of hoisting.

While there has been shown and described what is at present considered to be a preferred embodiment of the present invention, it will be obvious to those skilled in the art that various changes and modifications may be made therein without departing from the true spirit and scope of the invention. For example, any suitable means for detecting the introduction of elastance parameters into the system or for detecting reversal of the order signal may be substituted for the synchro motor, slip clutch and torque motor arrangement shown. Moreover, any electrical suitable means for modifying the order signal in a manner compensatorily related to backlash may be substituted for the differential generator expedient disclosed. It is, therefore, intended in the appended claims to cover all such changes and modifications as fall within the true scope of the invention and without that of the prior art.

The invention herein described may be manufactured and used by or for the Government of the United States of America for governmental purposes without the payment of any royalties thereon or therefor.

I claim:

1. In a control system of the type comprising means for transmitting a directionally significant electrical order signal and means responsive to said order signal for producing a mechanical positional response corresponding in direction to the said signal, the uncorrected backlash of said system occurring on a reversal in direction of said signal being such as to cause a predictable predetermined deviation between order and response, thus producing an effect equivalent to that which would be produced in a perfectly tight system by a modification of said order signal, a compensating arrangement comprising electrically responsive translating means for transmitting a predetermined motion in opposite directions of a magnitude corresponding to said predetermined deviation, an electrical power supply, circuit control means for connecting said supply to said translating means for causing motion in opposite directions, means coupled to the signal-transmitting means for detecting the introduction of backlash into the system resulting from a change in direction of said transmitting means and for actuating said circuit control means and means coupled to the responsive means and actuated by the translating means for modifying said order signal in a compensatory manner, thereby to correct said backlash.

2. A control system comprising means for transmitting a directionally significant electrical order signal, means including an electrical receiver responsive to said order signal for producing a mechanical response having a direction corresponding to said signal, the backlash of said system occurring upon a change in direction of said order signal being such as to cause a predictable predetermined deviation between order and response, a reversible motor, means responsive to the operation of said signal-transmitting means to produce a change in direction of said signal order for reversing direction of rotation of said motor, differential-generator signal translating means in circuit between said transmitter means and said receiver, said differential-generator means having a rotor coupled to said motor and adapted to be rotated thereby, and means for limiting the rotation of said rotor, thereby functionally to relate the modification of said order signal caused by said differential-generator means to said predetermined predictable deviation, whereby the undesirable effect of said backlash is reduced.

3. In an electro mechanical system for remotely transmitting mechanical motion to a member in either of two directions, said system being subject to undesirable backlash occurring on a change in direction of said transmitted motion such as to cause a predictable predetermined deviation in the transmission of said motion, an electrical synchrotransmitter for converting the mechanical motion into directionally-significant electrical order signals, an electrical receiver of said signals for transmitting motion to said member responsive to said signals, an electrical differential-generator having a rotor and a stator, means electrically connecting said stator to said transmitter, means electrically connecting said rotor to said receiver, and a means responsive to a reversal in direction of movement of said transmitter for rotating said rotor in magnitude and direction to compensate for said predetermined deviation.

ALFRED A. WOLF.

REFERENCES CITED

The following references are of record in the file of this patent:

UNITED STATES PATENTS

| Number | Name | Date |
|---|---|---|
| 1,977,624 | Davis | Oct. 23, 1934 |
| 1,998,939 | Mittag | Apr. 23, 1935 |
| 2,176,102 | Riggs | Oct. 17, 1939 |
| 2,351,743 | Chappell et al. | June 20, 1944 |
| 2,405,629 | Yardeny | Aug. 13, 1946 |